(12) United States Patent
Weir et al.

(10) Patent No.: US 7,788,297 B2
(45) Date of Patent: Aug. 31, 2010

(54) INTERACTIVE STORAGE METER FOR A STORAGE CONTAINER

(75) Inventors: Jeffrey Jon Weir, Seattle, WA (US); Colin R. Anthony, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 11/803,655

(22) Filed: May 15, 2007

(65) Prior Publication Data
US 2008/0288562 A1 Nov. 20, 2008

(51) Int. Cl.
*G06F 17/30* (2006.01)
(52) U.S. Cl. .................................. 707/805; 707/822
(58) Field of Classification Search .............. 707/205, 707/805, 822
See application file for complete search history.

(56) References Cited

U.S. PATENT DOCUMENTS

| | | | |
|---|---|---|---|
| 5,018,060 A | 5/1991 | Gelb et al. | |
| 5,664,146 A | 9/1997 | Bolin et al. | |
| 5,873,097 A | 2/1999 | Harris et al. | |
| 6,401,183 B1 * | 6/2002 | Rafizadeh | 711/173 |
| 6,613,101 B2 | 9/2003 | Mander et al. | |
| 6,725,228 B1 | 4/2004 | Clark et al. | |
| 7,080,099 B2 | 7/2006 | Tada et al. | |
| 7,162,466 B2 | 1/2007 | Kaasten et al. | |
| 7,353,358 B1 * | 4/2008 | Marokhovsky | 711/170 |
| 2004/0267701 A1 | 12/2004 | Horvitz et al. | |
| 2005/0138072 A1 | 6/2005 | Russo et al. | |
| 2006/0036568 A1 | 2/2006 | Moore et al. | |
| 2006/0041587 A1 * | 2/2006 | Grubbs et al. | 707/104.1 |
| 2006/0095705 A1 * | 5/2006 | Wichelman et al. | 711/171 |

(Continued)

FOREIGN PATENT DOCUMENTS

JP 05-274152 10/1993

(Continued)

OTHER PUBLICATIONS

Zhang et al., "Storage space allocation in container terminals", Transportation Research Part (B), Mar. 2003, P-883-891. Retrieved from the Internet: <URL: http://www.sciencedirect.com/science/article/B6V99-485P6GC-1/2/c9cb8efd30d6fddc9c83d6813f482307>.*

(Continued)

*Primary Examiner*—John E Breene
*Assistant Examiner*—Dennis Myint
(74) *Attorney, Agent, or Firm*—Mayer & Williams PC (57) ABSTRACT

An interactive, meter-type graphical user interface ("GUI") visually illustrates how the storage capacity of a physical or logical storage container is consumed by a number of items. Examples of items include physical units, logical units, or files of digital content. The items are arranged into a number of logical groups (each group including zero or more items) in accordance with user-selectable grouping criteria. The GUI displays group indicators in a manner that illustrates the relative amount of storage capacity consumed by each group (with respect to either total storage capacity or consumed storage capacity), and optionally by the individual items within each group. The GUI may also facilitate user manipulation of the items associated with each of the displayed groups, or suggest to the user how the unused storage capacity of a particular storage container may be consumed.

19 Claims, 4 Drawing Sheets

U.S. PATENT DOCUMENTS

2006/0271608 A1* 11/2006 Qi et al. .................. 707/205

FOREIGN PATENT DOCUMENTS

JP 06-161836 6/1994

OTHER PUBLICATIONS

Thain et al., "Operating System Support for Space Allocation in Grid Storage Systems", Proceedings of the 7th IEEE/ACM International Conference on Grid Computing, P-104-111, 2006. Retrieved from the Internet:<URL: http://portal.acm.org/ft_gateway.cfm?id=1513951&type=pdf&coll=GUIDE&dl=GUIDE&CFID=85967485&CFTOKEN=99327425>.*

Surendran Arun C., "Automatic Discovery of Personal Topics to Organize Email", pp. 1-6, Microsoft Research, Redmond, WA.

Mock Kenricj, "An Experimental Framework for Email Categorization and Management", Proceedings of the 24th annual international ACM SIGIR conference on Research and development in information retrieval, Date: 2001, pp. 392-393, ACM Press, New York, USA.

* cited by examiner

INTERACTIVE STORAGE METER FOR A STORAGE CONTAINER

BACKGROUND

Users of many types of physical and logical storage containers are generally interested in knowing how storage capacities of the containers are being consumed by items within the containers. Computer-readable media that retain digital data are common types of storage containers. Typical graphical, meter-type user experiences for computer-readable media containers indicate how much storage capacity is being used overall, but often fail to indicate how the storage capacity is allocated (for example, the specific digital content that is consuming storage capacity is not identified).

Although non-meter-type user experiences such as lists, tables, forms and the like may be available to indicate what and how much digital content consumes specific computer-readable media, such experiences do not generally allow users to change the manner in which consuming items are visually presented (for example, folder groupings, description layout, or list organization), and typically do not allow users to directly manipulate the items.

Users of storage containers are also generally interested in learning what can be done with unused storage capacity of a storage container. As such, it is desirable to provide users with hints about how such unused storage capacity can be consumed.

SUMMARY

Interactive, meter-type user experiences that visually display allocations of the storage capacities of physical or logical storage containers are discussed herein. In general, a certain amount of the storage capacity of a particular storage container is consumed by a number of items, such as physical units, logical units, or files of digital content, while another amount of the storage capacity remains for consumption.

The items consuming storage capacity are logically arranged into a number of groups in accordance with user-selectable grouping criteria. Virtually unlimited user-selectable grouping criteria and combinations thereof are possible, such as item-related information, container-related information, client-side or server-side operating environment characteristics or capabilities, temporal references, and user-related information, among others. In one exemplary implementation, an item identification software module associated with a client-side or network-side operating environment is configured to identify user-selectable grouping criteria and to logically arrange the items into groups in accordance with the grouping criteria.

Each logical group has zero or more items therein, which individually and collectively consume certain amounts of the storage capacity of the storage container. An interactive graphical user interface presents group indicators in a manner that visually illustrates the relative amounts of storage capacity consumed by the groups (either with respect to total storage capacity of the storage container, or the amount of consumed storage capacity), and optionally the individual items within the groups. For example, the groups and/or items therein may be represented in a graphical user interface via indicators of any desired geometries and/or dimensions, such as contiguous, linear, horizontal or vertical segments.

The graphical user interface may also facilitate user manipulation (for example, access, synchronization, deletion, modification, or movement) of the items associated with each of the displayed groups. In an exemplary scenario, a user gestures with respect to a portion of the interface (for example, the user hovers a control over a particular group indicator) to access manipulation options for the items associated with a particular group. In an exemplary implementation, an item manipulation software module associated with a client-side or network-side operating environment is configured to receive the user's selection of a particular item associated with a particular group, and to facilitate user manipulation of the particular item in the manner indicated by the user via the graphical user interface.

The interactive storage meter experience may further suggest to the user how portions of the remaining storage capacity of a particular storage container can be consumed.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

An interactive, meter-type graphical user interface ("GUI") implemented within a client-based or network-based operating environment visually illustrates how the storage capacity of a physical or logical storage container is allocated. A certain amount of the storage capacity of a particular storage container is consumed by physical, logical, or digital items, while another amount of the storage capacity remains for consumption.

The items are arranged into a number of logical groups (each group including zero or more items) in accordance with user-selectable grouping criteria. In an exemplary scenario, the grouping criteria are selectable via the GUI itself. The GUI displays group indicators in a manner that illustrates the relative amount of storage capacity consumed by each group (with respect to either total storage capacity of the container or storage capacity consumed by items within the container), and optionally by the individual items within each group. In an exemplary implementation of the GUI, the group indicators are displayed as contiguous, linear horizontal segments of varying lengths corresponding to the relative amounts of storage capacity consumed by each group. Other implementations are possible, however. Examples of alternative GUI implementations include but are not limited to bar charts, pie charts, line charts, area charts, doughnut charts, bubble charts, or visualizations having other geometries or dimensions. User gestures with respect to a particular group indicator (for example, hovering over, clicking on, or otherwise using a control to select a group indicator or individual item) result in the GUI presenting other commands that can be performed on a particular group or item(s) associated therewith. For example, the GUI may be configured to facilitate user manipulation of the items associated with each of the displayed groups, and/or suggest to the user how portions of the remaining storage capacity of a particular storage container may be consumed.

Figure 1:
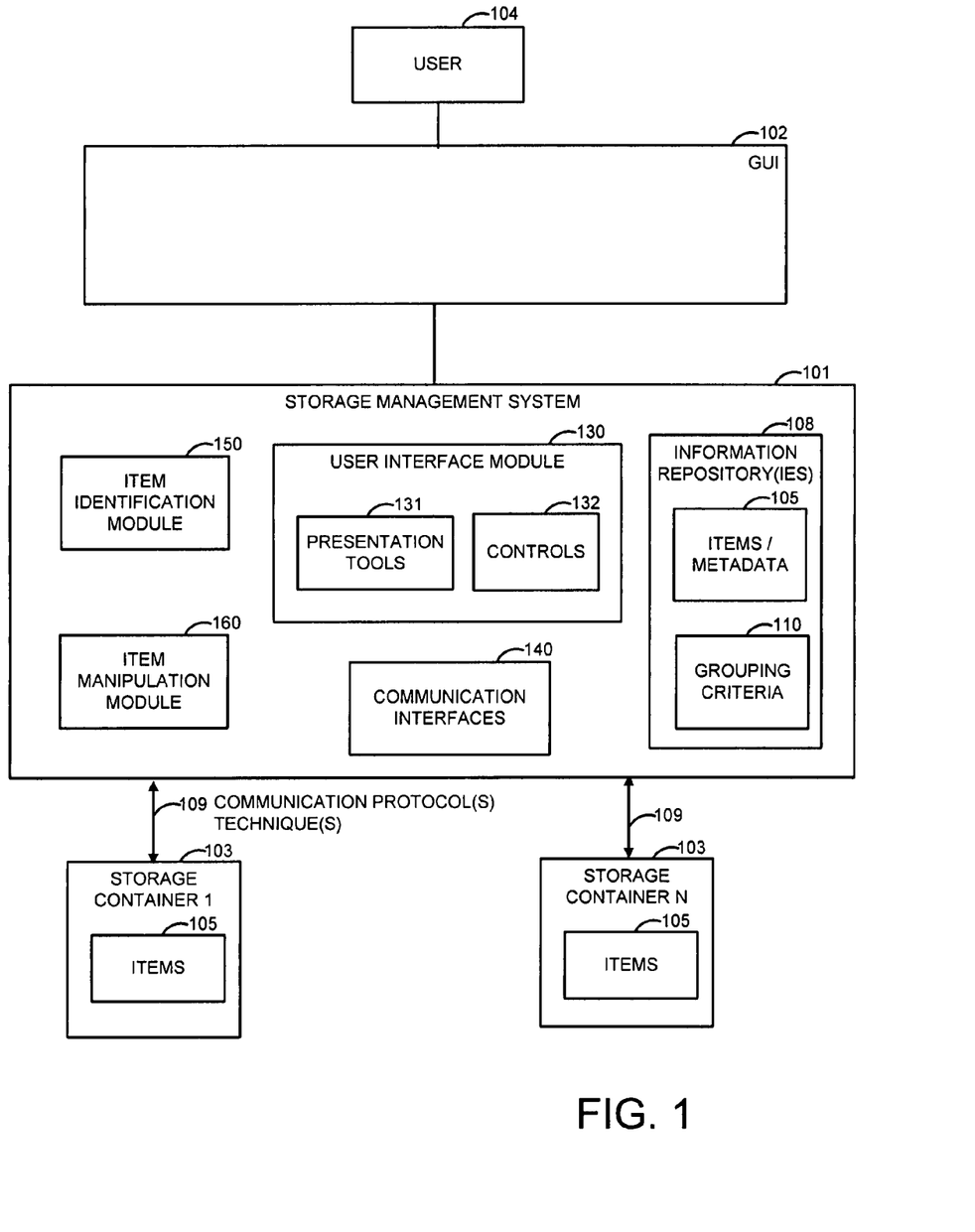
FIG. 1 is a simplified functional block diagram of a storage management system configured to ascertain an allocation of items within a storage container and to present a graphical user interface to a user based on the allocation.

Turning to the drawings, where like numerals designate like components, FIG. 1 is a simplified functional block diagram of a storage management system 101 that is configured to ascertain an allocation of items 105 within one or more storage containers 103 (1-N storage containers are depicted), which may be accessed via any communication protocol or technique 109, and to present a graphical user interface 102 to a user 104 based on the allocation. An exemplary graphical user interface 102 is shown and discussed in connection with FIG. 3.

Storage containers 103 represent physical or logical receptacles for storing items 105, which may themselves be physical or logical items, such as physical units, logical units, or digital content. Examples of storage containers 103 include but are not limited to local or remote computer-readable media that retain digital data (exemplary types of computer-readable media 404 are shown and discussed in connection with FIG. 4), energy storage equipment, and shopping carts. Exemplary items 105 include but are not limited to items of digital content (such as files or folders), goods, processes performed by devices, articles (and digital representations thereof)—such as money, points, certificates, or coupons—issued with the expectation of redemption, or units of materials or properties thereof.

Storage containers 103 have storage capacities. When the storage capacity of a particular storage container is neither full nor empty, a certain amount of the storage capacity can be considered to be consumed, and another amount of the storage capacity can be considered to be remaining for consumption. It will be understood that, as the storage capacity is consumed, the storage capacity may tend toward being "full" (for example, including or being consumed by more items), or being "empty" (for example, including or being consumed by fewer items).

Storage management system 101 is responsible for ascertaining how the storage capacities of one or more storage containers 103 are being consumed by items 105 within the containers, and for visually displaying to user 104 allocations of the storage capacities via interactive graphical user interface 102. Aspects of storage management system 101 may be implemented by a client-side application or device or a network-side application or device.

A simplified function block diagram of storage management system 101 includes: a user interface module 130, which further includes presentation tools 131 and controls 132; communication interfaces 140; one or more information repositories 108, which store grouping criteria 110 and optionally items 105 or references thereto (such as metadata); item identification module 150; and item manipulation module 160. In general, design choices and/or operating environments dictate how and whether specific functions of storage management system 101 are implemented. Such functions may be implemented using hardware, software, firmware, or combinations thereof.

User interface module 130 enables user 104 to interact with one or more functions provided by storage management system 101. In one scenario, a combination of presentation tools 131 and controls 132 are configured to enable user 104 to select one or more storage containers 103, information about which is ascertained via storage management system 101 and visually illustrated via interactive graphical user interface 102.

Presentation tools 131 provide output to user 104, and controls 132 of user interface module 130 facilitate the receipt of input from user 104. An example of a presentation tool is a visual display (such as aspects of graphical user interface 102 or elements thereof), a monitor, a window, a menu, or a layout thereof. An example of a control is an input device such as a remote control, a visual display (such as aspects of graphical user interface 102 or elements thereof), a mouse, a pen, a stylus, a trackball, a keyboard, a microphone, scanning device, a window, a menu, or a layout thereof, via which user 104 may issue commands. It will be appreciated that the same physical device or logical construct may function as an interface for both inputs to and outputs from user 104.

Communication interfaces 140 represent one or more physical or logical elements, such as connectivity devices, computer-executable instructions, sensors, buses, channels, networks, etc., that enable communication regarding items 105 between storage management system 101 and storage containers 103 via one or more communication protocols or techniques 109. Information received at a given communication interface may traverse one or more abstract communication/networking layers such as physical layers, data link layers, network layers, transport layers, session layers, presentation layers, or application layers.

Information repository 108 represents data storage or organization for information relating to items 105 within storage container(s) 103, including but not limited to items 105 themselves, metadata associated with the items (metadata is any descriptive or identifying information in computer-processable form that is associated with particular items 105), or grouping criteria 110. Information repository 108 may be implemented using various types and arrangements of computer-readable media 404 (discussed in connection with FIG. 4).

Grouping criteria 110 represent any information usable for decision-making regarding the presentation to user 104 of information relating to how the storage capacity of a particular storage container is or may be used. Virtually unlimited grouping criteria 110 and combinations thereof are possible. Grouping criteria 110 may be received, in whole or in part, from user 104 (via user interface module 130, such as via an aspect of GUI 102), pre-programmed into storage management system 101, or received from other sources. Grouping criteria 110 may be predetermined or dynamically created. Some examples of grouping criteria 110 include but are not limited to: information about user 104 (such as user preferences or information collected based on previous activities of the user with respect to storage management system 101); temporal references (such as times or dates); item-related information (such as item type, item quantity, digital content author or provider, item size/storage consumption, price/promotions, folder or other storage location, etc.), or third-party criteria such as advertising criteria, media source criteria, etc.

Item identification module 150 is responsible for: (1) utilizing grouping criteria 110 to logically organize items 105 associated with a particular storage container 103 into logical groups that include zero or more items 105 consuming (collectively and/or individually) certain amounts of the total or consumed storage capacity of the particular storage container, and (2) identifying types of items and allocations thereof that could consume the remaining storage capacity of a particular storage container.

With respect to the logical organization of items 105 into logical groups based on grouping criteria 110, item identification module 150 may use well-known query execution functions to ascertain the contents of a particular storage container in accordance with relevant grouping criteria 110. In one scenario, item identification module 150 retrieves information regarding all items 105 associated with a particular storage container 103 and then ascertains the logical associations between items consuming storage capacity of the storage container based on grouping criteria 110. In an alternative scenario, queries from item identification module to logic associated with the storage container reflect the application of grouping criteria to items associated with the storage container, in a manner that is understood by the logic associated with the storage container.

The logical groups of zero or more items formed by the application of grouping criteria 110 to the items consuming storage capacity of a particular storage container 103 are generally implemented by data structures that represent associations between particular items 105 and particular logical groups. Information repository 108 may be used to temporarily or permanently store the contents of the logical groups and/or data structures, such as items 105 or references thereto, while graphical user interface 102 is used to visually illustrate the logical groups (and/or items) and associated storage capacity allocation information.

With respect to identifying items and allocations thereof that could consume the remaining storage capacity of a particular storage container, item identification module 150 first identifies the one or more types of items that can consume the storage capacity. Next, the amount of the storage capacity consumable by representative items (such as items having average characteristics, user-selected characteristics, or other characteristics) of each type are identified. Then, a suggested allocation (for example, by quantity or quality) of items of the identified type(s) that could consume the remaining storage capacity may be ascertained. In one possible implementation, a data structure, such as a table, is used to store information regarding item types and their representative characteristics, and the data structure is accessed by item identification module 150 in connection with determining a suggested allocation of items that could consume the remaining storage capacity of a particular storage container.

Item manipulation module 160 represents functionality that enables a user, via graphical user interface 102, to manipulate (for example, access, synchronize, delete, modify, or move via well-known tools or techniques), or responds to user manipulation of, selected items associated with each of the displayed logical groups.

Figure 2:
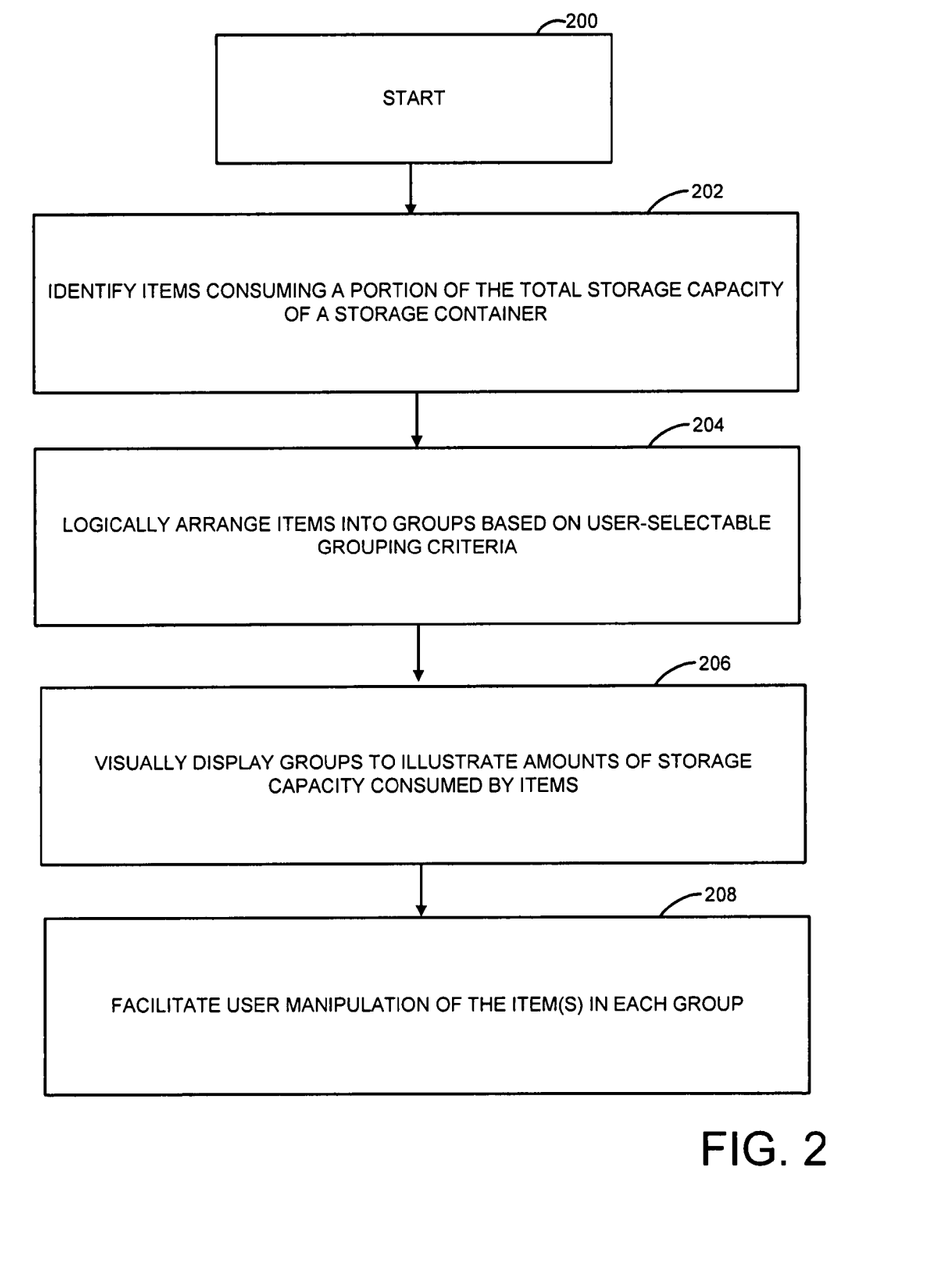
FIG. 2 is a flowchart illustrating certain aspects of a method for presenting the graphical user interface depicted in FIG. 1 to a user.

With continuing reference to FIG. 1, FIG. 2 is a flowchart illustrating certain aspects of a method for presenting graphical user interface 102 to user 104. The method(s) illustrated in FIG. 2 may be implemented using computer-executable instructions executed by one or more general, multi-purpose, or single-purpose processors (exemplary computer-executable instructions 406 and processor(s) 402 are shown and discussed in connection with FIG. 4). Unless specifically stated, the methods described herein are not constrained to a particular order or sequence. In addition, some of the described method(s) or elements thereof can occur or be performed concurrently. It will be further understood that all of the steps shown need not occur in performance of the functions described herein.

For exemplary purposes, it is assumed that a particular user 104, referred to as George, is using a storage container in the form of a computer-readable medium (such as a temporary or permanent memory on George's PC) to store a number of digital files organized into folders on George's behalf, and that George has opted to use GUI 102 to see how the storage capacity of the computer-readable medium is (or can be) allocated.

The method begins at block 200, and continues at block 202, where items consuming a first portion of the total storage capacity (generally, the consumed portion of the total storage capacity) of a storage container are identified. In the context of storage management system 101, communication interfaces 140 between one or more elements of storage management system 101 and a particular storage container 103 enable item identification module 150 to identify items 105 associated with the particular storage container 103. Using George's PC as an example, files stored in a particular computer-readable medium such as the hard drive are identified.

Next, at block 204, the identified items are logically arranged into groups based on user-selectable grouping criteria. In the context of storage management system 101, one or more grouping criteria 110 are automatically or manually selected. In one scenario, user interface module 130 enables George to manually select grouping criteria 110 (for example, grouping items by folder and folder size) via GUI 102. Alternatively, George may select grouping criteria 110 via another user interface, or grouping criteria 110 may be selected automatically in whole or in part. Item identification module 105 is responsible for utilizing selected grouping criteria 110 to logically organize items 105 into logical groups that include zero or more items 105.

As indicated at block 206, group indicators corresponding to the groups discussed in connection with block 204 are visually displayed in a manner that illustrates the amounts of storage capacity (either with respect to the total storage capacity or the first portion of the total storage capacity) consumed collectively or individually by items 105 therein. In the context of storage management system 101, graphical user interface 102 visually presents one or more group indicators. Graphical user interface 102 also facilitates user manipulation of all or some of the items associated with the displayed group indicators, as indicated at block 208. It will be appreciated that a one-to-one correspondence of groups and group indicators is not necessary. For example, certain groups or items may be aggregated and represented using a single indicator. In one exemplary scenario where it may be useful to display aggregated groups or items using fewer group indicators, there is more information associated with the contents of one or more storage containers than is displayable by a particular graphical user interface 102. For example, consider a graphical user interface that is 100 pixels wide, representing 100 Megabytes of storage capacity. If 200 containers need to be represented by the graphical user interface, and the containers collectively consume 50 Megabytes of storage capacity, the graphical user interface would not have enough visual space to represent each of the containers—representing a number of containers that collectively consume a nominal amount of storage space by a single indicator may be desirable.

Figure 3:
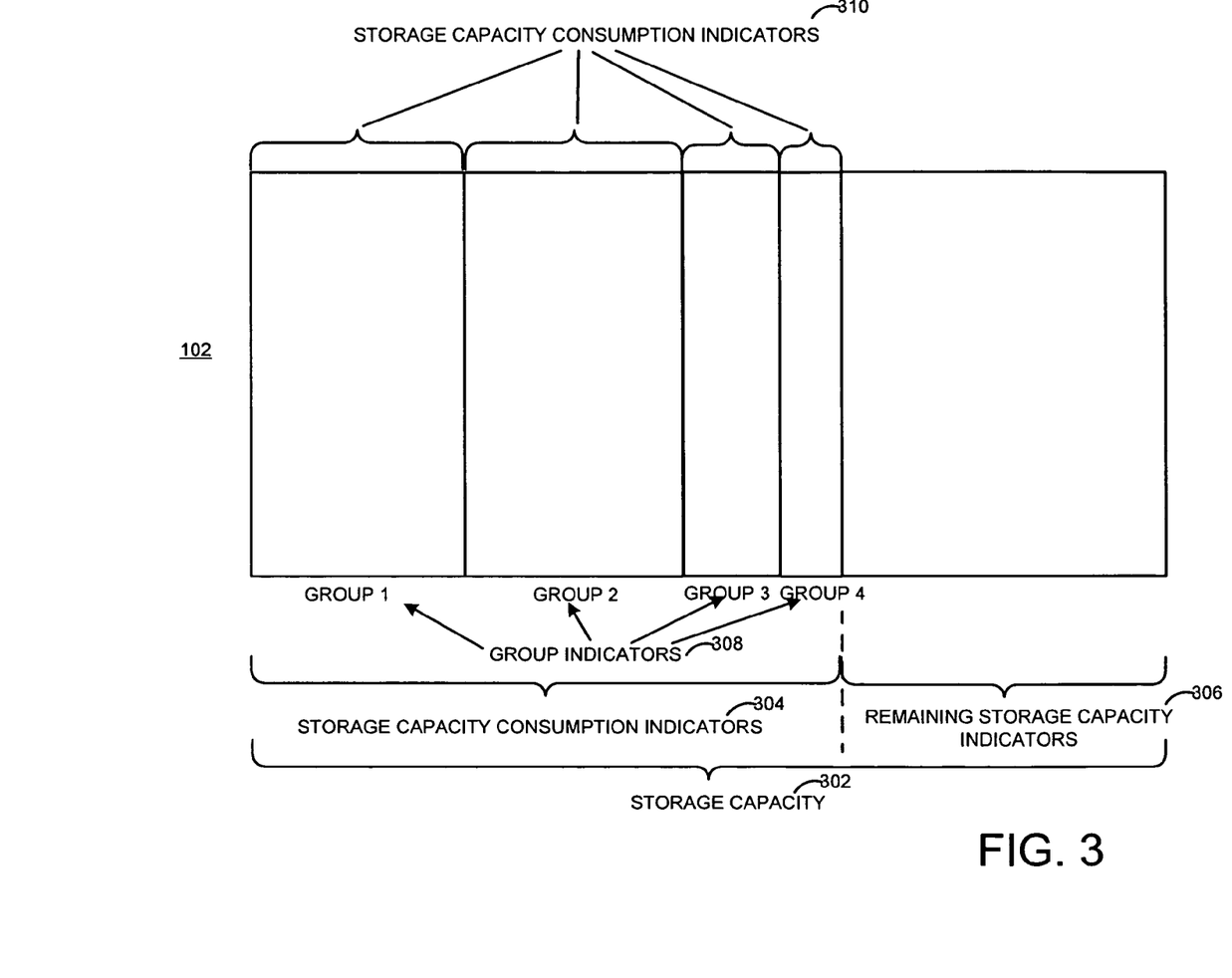
FIG. 3 illustrates an exemplary implementation of the graphical user interface depicted in FIG. 1.

With continuing reference to FIGS. 1 and 2, FIG. 3 illustrates an exemplary implementation of graphical user interface 102, which is used to display group indicators corresponding to folders of digital files (by folder size, from largest to smallest) on George's PC's hard drive. As shown, graphical user interface 102 is a meter-type interface composed of a number of indicator segments arranged in a contiguous, linear, horizontal manner. It will be appreciated, however, that indicators and arrangements thereof may have any other desired geometries and/or dimensions, such as bar charts, pie charts, line charts, area charts, doughnut charts, bubble charts, or other visualizations.

One or more consumed storage capacity indicators 304 represent a certain amount of total storage capacity 302 that is consumed by one or more items 105 (of the hard drive using George's PC as an example). In an exemplary implementation, graphics and/or text are used to expressly quantify units of the total storage capacity consumed by units of items. Using George's hard drive as an example, consumed capacity storage indicator 304 may be in the form of text such as "X bytes used by X folders," or variations thereof. Storage capacity indicator(s) 304, however, need not be express quantifiers—any visual indication of the amount total storage capacity relative to the amount of consumed storage capacity may serve as a consumed storage capacity indicator 304 without a specific label.

One or more remaining storage capacity indicators 306 (one shown) represent an amount of total storage capacity 302 that remains for consumption. As described in connection with consumed storage capacity indicator(s) 304, remaining storage capacity indicator(s) 306 may expressly quantify remaining units of the total storage capacity, or may simply visually indicate the amount of remaining storage capacity relative to the amount of total storage capacity. Remaining storage capacity indicators 306 (or separate indicators) may also be used to provide a suggested allocation of items that could consume the remaining storage capacity of the storage container, using the same or different techniques used to illustrate how the storage capacity of the storage container is consumed by various items.

Group indicators 308 (four shown) represent logical sets of zero or more items, formed based on grouping criteria 110, which individually or collectively consume certain amounts of the total or consumed storage capacity (such amounts are represented by storage capacity consumption indicators 310) of a particular storage container such as George's PC's hard drive. Storage capacity consumption indicators 310 are configured (as shown, by size) to visually illustrate the relative amounts of capacity consumed by the items associated with their corresponding groups—in the case of the hard drive, in accordance with folder size from largest to smallest. It may be desirable to use color, graphics, or text in addition to size or shape to illustrate relative amounts of capacity consumed. For example, group indicators 308 and/or storage capacity consumption indicators 310 may expressly quantify units of capacity consumed by units of items or groups (for example, "X bytes used by Photos folder"). It will be understood that group indicators and storage capacity consumption indicators 310 need not be separate entities—for example, segments sized or shaped or otherwise labeled relative to the amount of total or consumed storage capacity of the logical groups (or items therein) they represent may be displayed, and such segments may serve as both group indicators and storage capacity consumption indicators 310.

Group indicators are generally user-selectable. Other indicators, such as storage capacity consumption indicators 310 or remaining storage capacity indicator(s) 306, may also be user-selectable. In one scenario, a user gestures with respect to a portion of graphical user interface 102 to access options for arranging or manipulating indicators and/or groups or items represented thereby. For example, George may use a control such as a mouse/cursor to hover over or select a particular indicator, and to receive options for: re-grouping items stored on the PC's hard drive (or portions thereof) in accordance with new grouping criteria 110; suggestions regarding quantities and/or qualities of items that may consume the remaining storage capacity of the hard drive; or accessing, synchronizing, deleting, modifying, adding, or moving files or folders.

In this manner, it is possible for a single meter-type graphical user interface to give a user a visual sense of how much of the storage capacity of a particular storage container is being used, and what items are consuming the storage capacity. The user is able to change what groupings of items are shown based on user-selectable grouping criteria, and is able to navigate to, and take action on, particular items directly from the graphical user interface. The user can also learn about what can be done with remaining storage capacity, such as item types and quantities/qualities thereof that may be stored.

With continued reference to FIGS. 1-3, FIG. 4 is a block diagram of an exemplary configuration of an operating environment 400 (such as a client-side device or client-based application or a network server or application) in which all or part of storage management system 101, and/or the method(s) shown and discussed in connection with FIG. 3 may be implemented or used. Operating environment 400 is generally indicative of a wide variety of general-purpose or special-purpose computing environments, and is not intended to suggest any limitation as to the scope of use or functionality of the system(s) and methods described herein.

Figure 4:
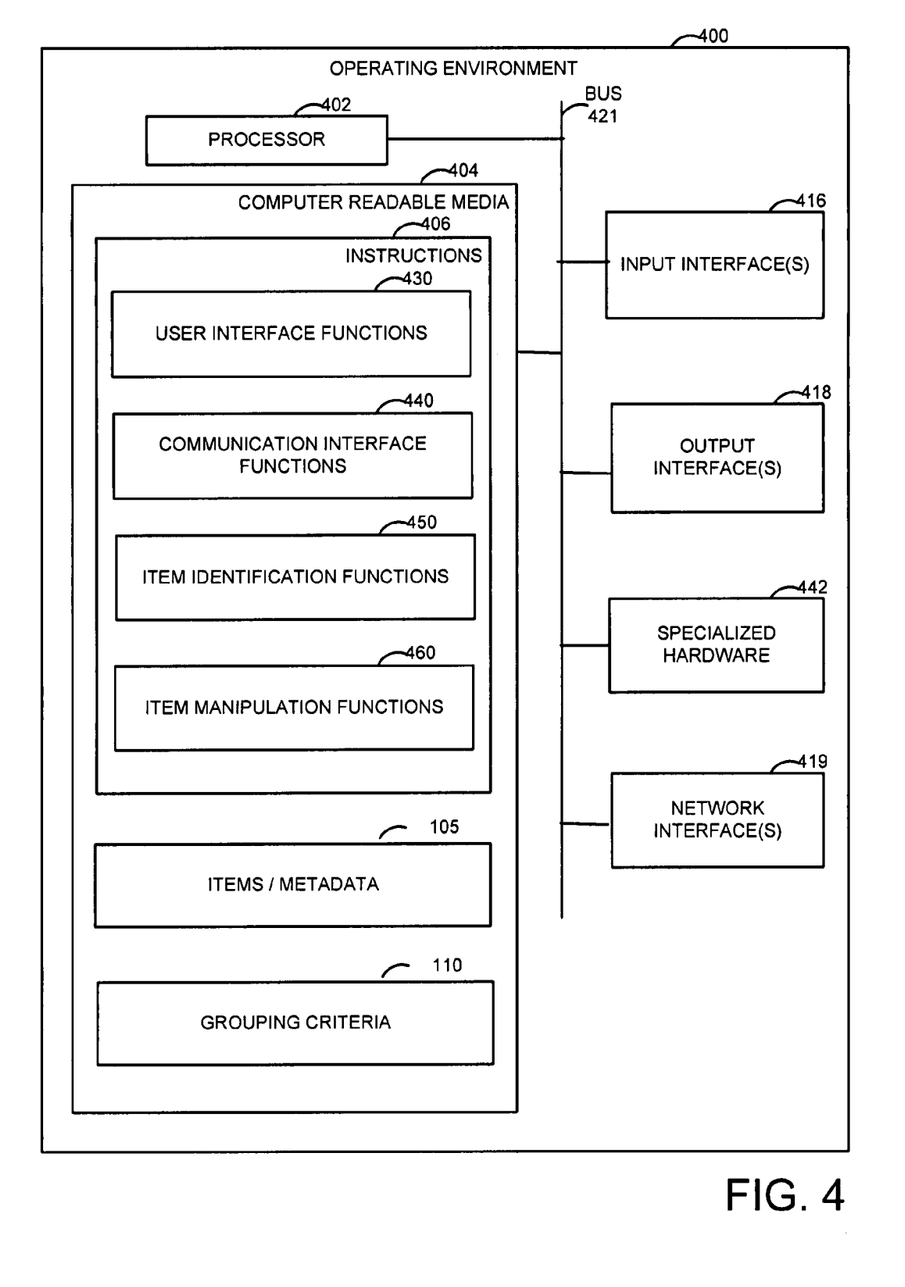
FIG. 4 is a simplified functional block diagram of an exemplary configuration of an operating environment in which the system shown in FIG. 1 may be implemented or used.

As shown, operating environment includes processor 402, computer-readable media 404, and computer-executable instructions 406. One or more internal buses 421, which are widely available elements, may be used to carry data, addresses, control signals and other information within, to, or from operating environment 400 or elements thereof.

Processor 402, which may be a real or a virtual processor, controls functions of operating environment 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording, storing, or transmitting computer-readable data, such as computer-executable instructions 406 or items of digital content. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 404 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

As shown, certain computer-executable instructions 406 implement user interface functions 430, which implement aspects of user interface module 130 (shown in FIG. 1); certain computer-executable instructions 406 implement communication interface functions 440, which implement aspects of communication interface(s) 1400; certain computer-executable instructions 406 implement item identification functions 450, which implement aspects of item identification module 150; and certain computer-executable instructions 406 implement item manipulation functions 460, which implement aspects of item manipulation module 160.

Input interface(s) 416 are physical or logical elements that facilitate receipt of input to operating environment 400. Input may be received using any type of now known or later-developed physical or logical elements, such as user interfaces, remote controls, displays, mice, pens, styluses, trackballs, keyboards, microphones, scanning devices, and all types of devices that are used input data.

Output interface(s) 418 are physical or logical elements that facilitate provisioning of output from operating environment 400. Output may be provided using any type of now known or later-developed physical or logical elements, such as user interfaces, displays, printers, speakers, disk drives, and the like.

Network interface(s) 419 (aspects of which are discussed in more detail above, in connection with communication interfaces 140 shown in FIG. 1) are one or more physical or logical elements that enable communication by operating environment 400 via one or more protocols or techniques.

Specialized hardware 442 represents any hardware or firmware that implements functions of operating environment 400. Examples of specialized communication hardware include encoder/decoders ("CODECs"), decrypters, application-specific integrated circuits, secure clocks, and the like.

It will be appreciated that particular configurations of operating environment 400 or storage management system 101 may include fewer, more, or different components or functions than those described. In addition, functional components of operating environment 400 or storage management system 101 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable medium encoded with computer-executable instructions which, when executed by a processor, perform a method for presenting to a user a graphical user interface associated with a storage container having a storage capacity, the method comprising:

identifying a plurality of items, the plurality of items collectively consuming a first portion of the storage capacity;

logically arranging the plurality of items into a plurality of groups in accordance with user-selectable grouping criteria, each group having associated therewith zero or more items and a storage capacity consumption amount representing an amount of the storage capacity or the first portion of the storage capacity consumed by the zero or more items;

for each group, associating a meter-type storage capacity consumption indicator therewith, a particular meter-type storage capacity consumption indicator comprising a geometric object that visually illustrates a relative amount of the storage capacity or the first portion of the storage capacity being consumed by the zero or more items associated with a particular group;

arranging for display of at least some of the meter-type storage capacity consumption indicators in a manner that visually illustrates a relative size of the storage capacity consumption amount associated with each of the groups associated with the displayed meter-type storage capacity consumption indicators;

identifying a second portion of the storage capacity remaining for consumption;

associating a meter-type remaining storage capacity indicator with the second portion of the storage capacity, the meter-type remaining storage capacity indicator comprising a geometric object that visually illustrates the second portion of the storage capacity relative to the first amount of the storage capacity;

arranging for display of the meter-type remaining storage capacity indicator;

identifying a type of item that can consume the storage capacity;

predicting an amount of the storage capacity consumed by a representative item of the identified type; and based on the identified type and the predicted amount of the storage capacity, determining an allocation of items of the identified type that could consume the second portion of the storage capacity.

2. The computer-readable medium according to claim 1, wherein the method step of arranging for display further comprises:

arranging for display of at least some of the meter-type storage capacity consumption indicators in a manner that facilitates user manipulation of the zero or more items associated with the groups associated therewith.

3. The computer-readable medium according to claim 2, wherein the method further comprises:

arranging to notify the user of the allocation.

4. The computer-readable medium according to claim 3, wherein the representative item of the identified type comprises an item of the identified type having predetermined characteristics, the predetermined characteristics selected from the group consisting of: average characteristics; characteristics associated with one or more items of the plurality of items; and user-selected characteristics.

5. The computer-readable medium according to claim 3, wherein
the method step of identifying a type of item that can consume the storage capacity comprises identifying a plurality of types of items that can consume the storage capacity,
the method step of predicting an amount of the storage capacity consumable by a representative item of the identified type comprises predicting the amounts of storage capacity consumable by representative items of each identified type,
the method step of determining an allocation of representative items that could consume the second portion of the storage capacity comprises
selecting at least some of the plurality of types of items that can consume the storage capacity, and
determining quantities of representative items of each selected type that could consume the second portion of the storage capacity, and
the method step of arranging to notify the user of the allocation comprises arranging to notify the user of the quantities of representative items of each selected type that could consume the second portion of the storage capacity.

6. The computer-readable medium according to claim 1, wherein the method step of determining an allocation of items comprises determining a quantity of items.

7. The computer-readable medium according to claim 1, wherein the method further comprises:
receiving a user selection of a particular item associated with a particular group associated with a particular displayed meter-type storage capacity consumption indicator; and
based on the user selection, facilitating manipulation of the particular item.

8. The computer-readable medium according to claim 7, wherein the method step of facilitating manipulation is selected from the group consisting of: navigating to the particular item; moving the particular item; responding to user movement of the particular item; synchronizing the particular item; accessing the particular item; modifying the particular item; deleting the particular item; and changing the group with which the particular item is associated.

9. The computer-readable medium according to claim 7, wherein the method step of receiving a user selection further comprises:
receiving an indication of a user gesture with respect to a portion of the display of at least some of the meter-type storage capacity consumption indicators.

10. The computer-readable medium according to claim 1, wherein the storage container is selected from the group consisting of: a physical storage container; and a logical storage container.

11. The computer-readable medium according to claim 1, wherein the plurality of items are selected from the group consisting of: physical units; logical units; and digital content.

12. The computer-readable medium according to claim 1, wherein the computer-executable instructions are executable by a client-side processor or a network-side processor.

13. A system for displaying a storage meter for a storage container, the storage container having a storage capacity, a first amount of the storage capacity being consumed by a plurality of items and a second amount of the storage capacity remaining for consumption, the system comprising:
a computer-readable storage medium; and
a processor responsive to the computer-readable storage medium and to one or more computer programs stored in the computer-readable storage medium, the one or more computer programs comprising
an item identification module configured to identify user-selectable grouping criteria and to logically arrange the plurality of items into a plurality of groups in accordance with the grouping criteria, each group having associated therewith zero or more items and a storage capacity consumption amount representing an amount of the storage capacity or the portion of the storage capacity consumed by the zero or more items, and
a user interface module responsive to the item identification module, the user interface module configured to visually display to a user
a number of user-selectable group indicators, each group indicator representing one of the plurality of groups identified via the item identification module,
a meter-type storage capacity consumption indicator associated with each group indicator, a particular storage capacity consumption indicator comprising a geometric object that visually illustrates a relative amount of the amount of the storage capacity or the first amount of the storage capacity being consumed by the zero or more items associated with a particular group indicator, and
a meter-type remaining storage capacity indicator comprising a geometric object that visually illustrates the second amount of the storage capacity relative to the first amount of the storage capacity,
the one or more computer programs operable to perform a method comprising
identifying a type of item that can consume the second amount of the storage capacity,
predicting an amount of the storage capacity consumed by a representative item of the identified type, and
based on the identified type and the predicted amount of the storage capacity, determining an allocation of items of the identified type that could consume the second amount of the storage capacity.

14. The system according to claim 13, wherein user selection of a particular group indicator facilitates user manipulation of the zero or more items associated therewith.

15. The system according to claim 13, wherein the storage capacity consumption indicators are segments having different relative sizes, arranged in a manner selected from the group consisting of: horizontally; vertically; and geometrically.

16. The system according to claim 13, wherein the one or more computer programs further comprises:
an item manipulation module responsive to the user interface module, the item manipulation module configured to receive a user selection of a particular item associated with a particular group, and to facilitate user manipulation of the particular item.

17. The system according to claim 13, wherein the system is associated with a client-based product or a network-based product.

18. The system according to claim 13, wherein determining an allocation of items comprises determining a quantity of items.

19. The system according to claim 13, wherein the method further comprises notifying the user of the allocation.

* * * * *